United States Patent
Gao et al.

(10) Patent No.: US 11,687,588 B2
(45) Date of Patent: Jun. 27, 2023

(54) WEAKLY SUPERVISED NATURAL LANGUAGE LOCALIZATION NETWORKS FOR VIDEO PROPOSAL PREDICTION BASED ON A TEXT QUERY

(71) Applicant: salesforce.com, inc., San Francisco, CA (US)

(72) Inventors: Mingfei Gao, San Jose, CA (US);
Richard Socher, Menlo Park, CA (US);
Caiming Xiong, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 771 days.

(21) Appl. No.: 16/531,343

(22) Filed: Aug. 5, 2019

(65) Prior Publication Data

US 2020/0372116 A1 Nov. 26, 2020

Related U.S. Application Data

(60) Provisional application No. 62/851,030, filed on May 21, 2019.

(51) Int. Cl.
*G06F 16/735* (2019.01)
*G06F 16/73* (2019.01)
(Continued)

(52) U.S. Cl.
CPC ......... *G06F 16/735* (2019.01); *G06F 16/73* (2019.01); *G06F 17/10* (2013.01); *G06F 18/2185* (2023.01); *G06F 40/47* (2020.01); *G06N 3/08* (2013.01); *G06V 10/82* (2022.01); *G06V 20/41* (2022.01); *G06V 20/49* (2022.01);
(Continued)

(58) Field of Classification Search
CPC ..... G06F 16/73; G06F 16/745; G06K 9/6273; G06V 20/41; G06V 20/52
See application file for complete search history.

(56) References Cited

U.S. PATENT DOCUMENTS 9,672,280 B2 * 6/2017 Liu ..................... G06F 16/73
10,282,663 B2 5/2019 Socher et al.
(Continued)

OTHER PUBLICATIONS

Bilen et al., "Weakly Supervised Deep Detection Networks," In The IEEE Conference on Computer Vision and Pattern Recognition (CVPR), pp. 1-9, 2016.
(Continued)

*Primary Examiner* — Farzad Kazeminezhad
(74) *Attorney, Agent, or Firm* — Haynes and Boone, LLP

(57) ABSTRACT

Systems and methods are provided for weakly supervised natural language localization (WSNLL), for example, as implemented in a neural network or model. The WSNLL network is trained with long, untrimmed videos, i.e., videos that have not been temporally segmented or annotated. The WSNLL network or model defines or generates a video-sentence pair, which corresponds to a pairing of an untrimmed video with an input text sentence. According to some embodiments, the WSNLL network or model is implemented with a two-branch architecture, where one branch performs segment sentence alignment and the other one conducts segment selection. These methods and systems are specifically used to predict how a video proposal matches a text query using respective visual and text features.

18 Claims, 5 Drawing Sheets

(51) Int. Cl.
| | |
|---|---|
| G06V 10/82 | (2022.01) |
| G06F 16/74 | (2019.01) |
| G06V 20/40 | (2022.01) |
| G06F 17/10 | (2006.01) |
| G06N 3/08 | (2023.01) |
| G06F 40/47 | (2020.01) |
| G06F 18/21 | (2023.01) |
| G06V 10/44 | (2022.01) |

(52) U.S. Cl.
CPC ............ *G06V 10/454* (2022.01); *G06V 20/44* (2022.01); *G06V 20/46* (2022.01)

(56) References Cited

U.S. PATENT DOCUMENTS

| | | | |
|---|---|---|---|
| 10,346,721 | B2 | 7/2019 | Albright et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,546,217 | B2 | 1/2020 | Albright et al. |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0124331 | A1* | 5/2018 | Min .................. G06V 20/52 |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0188568 | A1 | 6/2019 | Keskar et al. |
| 2019/0213482 | A1 | 7/2019 | Socher et al. |
| 2019/0251168 | A1 | 8/2019 | McCann et al. |
| 2019/0251431 | A1 | 8/2019 | Keskar et al. |
| 2019/0258714 | A1 | 8/2019 | Zhong et al. |
| 2019/0258939 | A1 | 8/2019 | Min et al. |
| 2019/0266407 | A1* | 8/2019 | Gupta .................. G06K 9/6273 |
| 2019/0286073 | A1 | 9/2019 | Hosseini-Asl et al. |
| 2019/0295530 | A1 | 9/2019 | Hosseini-Asl et al. |
| 2019/0304157 | A1* | 10/2019 | Amer .................. G06V 20/41 |
| 2019/0341028 | A1* | 11/2019 | Loghmani ............. G06F 16/745 |
| 2019/0362020 | A1 | 11/2019 | Paulus et al. |
| 2019/0362246 | A1 | 11/2019 | Lin et al. |

OTHER PUBLICATIONS

Bojanowski et al., "Weakly Supervised Action Labeling in Videos under Ordering Constraints," In European Conference on Computer Vision, pp. 628-643. Springer.
Buch et al., "SST: Single-stream Temporal Action Proposals," In CVPR, pp. 1-10, 2017.
Chao et al., "Rethinking the Faster R-CNN Architecture for Temporal Action Localization," In CVPR, pp. 1130-1139, 2018.
Dai et al., Temporal Context Network for Activity Localization in Videos, In ICCV, pp. 1-10, 2017.
Devlin et al., "BERT: Pre-training of Deep Bidirectional Transformers for Language Understanding," arXiv preprint arXiv:1810. 04805, pp. 1-14, 2018.
Diba et al., "Weakly Supervised Cascaded Convolutional Networks," In Proceedings of the 2017 IEEE Conference on Computer Vision and Pattern Recognition (CVPR), pp. 914-922, 2017.
Duan et al. "Weakly Supervised Dense Event Captioning in Videos," In Advances in Neural Information Processing Systems, pp. 3059-3069, 2018.
Duchenne et al., Automatic Annotation of Human Actions in Video. In ICCV, vol. 1, pp. 1-8, 2009.
Gao et al., "Tall: Temporal Activity Localization via Language Query," In Proceedings of the IEEE International Conference on Computer Vision, pp. 5267-5275, 2017.
Gao et al. "TURN TAP: Temporal Unit Regression Network for Temporal Action Proposals," ICCV, pp. 1-9, 2017b.
Gao et al., "C-WSL: Count-guided Weakly Supervised Localization," In ECCV, pp. 1-17, 2018.
Hendrick et al., "Localizing Moments in Video with Natural Language," In Proceedings of the IEEE International Conference on Computer Vision, pp. 5803-5812, 2017.
Hendricks et al., "Localizing Moments in Video with Temporal Language," In Empirical Methods in Natural Language Processing (EMNLP), pp. 1380-1390, 2018.
Hu et al., "Natural Language Object Retrieval," In Proceedings of the IEEE Conference on Computer Vision and Pattern Recognition, pp. 4555-4564, 2016.
Huang et al., "Connectionist Temporal Modeling for Weakly Supervised Action Labeling," In European Conference on Computer Vision, pp. 137-153. Springer, 2016.
Jie et al., "Deep Self-taught Learning for Weakly Supervised Object Localization," arXiv:1704.05188v1, pp. 1-9, 2017.
Kantorov et al., "Contextlocnet: Context-aware Deep Network Models for Weakly Supervised Localization," In European Conference on Computer Vision, pp. 350-365, Springer, 2016.
Kipf et al., "Semi-supervised Classification with Graph Convolutional Networks," arXiv preprint arXiv:1609.02907, pp. 1-10, 2016.
Krishna et al., "Dense-captioning Events in Videos," In International Conference on Computer Vision (ICCV), pp. 706-715, 2017.
Laptev et al., "Learning Realistic Human Actions from Movies," In CVPR, pp. 1-8, 2008.
Li et al., "Weakly Supervised Object Localization with Progressive Domain Adaptation," In The IEEE Conference on Computer Vision and Pattern Recognition (CVPR), pp. 3512-3520, 2016.
Liu et al., "Temporal Modular Networks for Retrieving Complex Compositional Activities in Videos," In Proceedings of the European Conference on Computer Vision (ECCV), pp. 552-568, 2018.
Oquab et al., "Is Object Localization for Free?—Weakly-supervised Learning with Convolutional Neural Networks," In Proceedings of the IEEE Conference on Computer Vision and Pattern Recognition, pp. 685-694, 2015.
Papadopoulos et al., "Training Object Class Detectors with Click Supervision," pp. 6374-6383, CVPR, 2017.
Shou et al., "Autoloc: Weakly-supervised Temporal Action Localization in Untrimmed Videos," In Proceedings of the European Conference on Computer Vision (ECCV), pp. 154-171, 2018.
Shou et al., "Temporal Action Localization in Untrimmed Videos via Multi-stage CNNS," In CVPR, pp. 1-10, 2016.
Simonyan et al., "Very Deep Convolutional Networks for Large-scale Image Recognition," arXiv:1409.1556, pp. 1-10, 2014.
Tang et al., "Multiple Instance Detection Network with Online Instance Classifier Refinement," CVPR, pp. 2843-2851, 2017.
Tran et al., "Learning Spatiotemporal Features with 3d Convolutional Networks," In JCCV, pp. 4489-4497, 2015.
Wang et al., "UntrimmedNets for Weakly Supervised Action Recognition and Detection," In Proceedings of the IEEE Conference on Computer Vision and Pattern Recognition, pp. 4325-4334, 2017.
Yuan et al., "To IND where you Talk: Temporal Sentence Localization in Video with Attention based Location Regression," arXiv preprint arXiv:1804.07014, pp. 1-9, 2018.

(56) References Cited

OTHER PUBLICATIONS

Zhang et al., "Man: Moment Alignment Network for Natural Language Moment Retrieval via Iterative Graph Adjustment," arXiv preprint arXiv:1812.00087, pp. 1-11, 2018.
Zhao et al., "Temporal Action Detection with Structured Segment Networks," In ICCV, pp. 2914-2923, 2017.

* cited by examiner

| Model | WS | IoU=0.1 | IoU=0.3 | IoU=0.5 | mIoU |
|---|---|---|---|---|---|
| CTRL | False | 49.1 | 28.7 | 14.0 | 20.5 |
| ABLR | False | 73.3 | 55.7 | 36.8 | 37.0 |
| WSDEC-S | False | 70.0 | 52.9 | 37.6 | 40.4 |
| WSDEC-W | True | 62.7 | 42.0 | 23.3 | 28.2 |
| WSLLN | True | 75.4 | 42.8 | 22.7 | 32.2 |

FIG. 4A

| $\lambda \rightarrow$ | 0.0 | 0.1 | 0.2 | 0.3 | 0.4 | 0.5 |
|---|---|---|---|---|---|---|
| IoU=0.1 | 64.9 | 75.4 | 75.5 | 75.5 | 75.5 | 66.6 |
| IoU=0.3 | 36.2 | 42.8 | 42.9 | 42.9 | 42.9 | 38.3 |
| IoU=0.5 | 19.4 | 22.7 | 22.7 | 22.8 | 22.7 | 20.7 |
| mIoU | 27.4 | 32.2 | 32.3 | 32.3 | 32.3 | 28.8 |

FIG. 4B

| Model | WS | Input | R@1 | R@5 | mIoU |
|---|---|---|---|---|---|
| Chance | – | – | 3.75 | 22.50 | 22.64 |
| LOR | False | RGB | 16.2 | 43.9 | 27.2 |
| MCN | False | RGB | 23.1 | 73.4 | 35.5 |
| MCN | False | Flow | 25.8 | 75.4 | 38.9 |
| WSLLN | True | RGB | 19.4 | 53.1 | 25.4 |
| WSLLN | True | Flow | 18.4 | 54.4 | 27.4 |

*FIG. 4C*

WEAKLY SUPERVISED NATURAL LANGUAGE LOCALIZATION NETWORKS FOR VIDEO PROPOSAL PREDICTION BASED ON A TEXT QUERY

RELATED APPLICATION

This application claims priority to U.S. Provisional Patent Application No. 62/851,030 filed May 21, 2019, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to neural networks and deep learning models and, in particular, to weakly supervised natural language localization networks.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Video has become an important source for humans to perceive visual information and acquire knowledge (e.g., video lectures, making sandwiches, changing tires, and/or the like). Video content consumes high cognitive bandwidth and is often slow for a human to digest.

To assist human users with understanding and/or focusing on potentially relevant portions of a video, artificial intelligence or deep learning models can be employed. For example, artificial intelligence or deep learning models can be used to implement or perform natural language localization (NLL). NLL is a technique or process which attempts to localize or identify (predict start and end times for) a segment or portion in an untrimmed video in response to an arbitrary text query.

BRIEF DESCRIPTION OF THE DRAWINGS

FIGS. 4A-4C illustrate tables with example comparison results, according to some embodiments.

Figure 1:
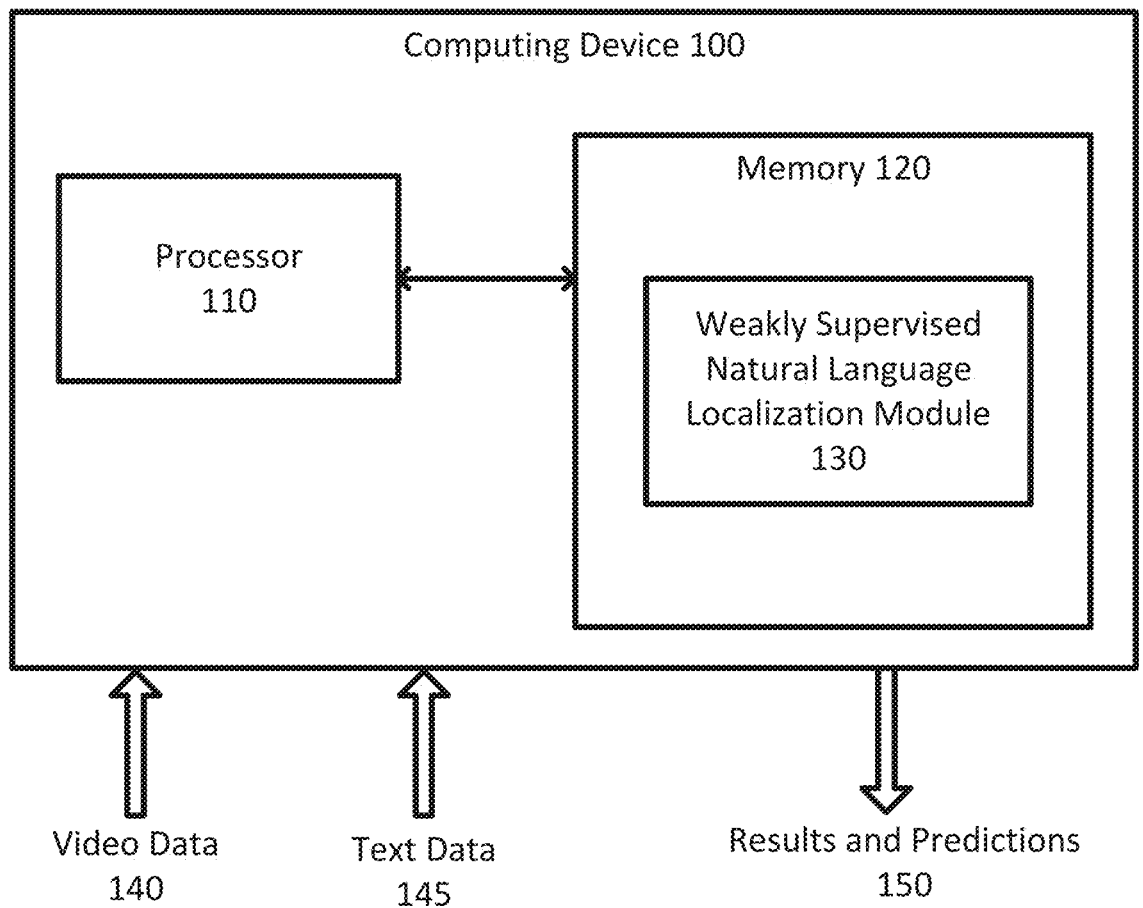
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Artificial intelligence, implemented with neural networks and deep learning models, has demonstrated great promise as a technique for automatically analyzing real-world information with human-like accuracy. In general, such neural network and deep learning models receive input information and make predictions based on the input information.

One application for artificial intelligence is natural language localization (NLL), which attempts to localize or identify (predict start and end times for) a segment or portion in an untrimmed video in response to an arbitrary text query regarding an event or item of interest that might appear in the video. However, neural networks and deep learning models may face challenges with NLL. For example, to learn the correspondence between visual segments and texts, conventional methods and techniques require temporal coordinates (start and end times) of such events for training, which leads to high costs of annotation or supervision. In particular, to successfully train a NLL model, a large number of diverse language descriptions are needed to describe different temporal segments of videos. These descriptions have typically been generated by human annotators, which incurs high human labeling or supervising cost. That is, with highly or strongly supervised NLL, a human annotator would have already identified the relevant segment of the video (i.e., by starting time and ending time) and provided a suitable annotation. Examples of such strongly supervised models and techniques include CTRL, ABLR, MCN, temporal modular networks (TMN), LOR, MLLC, and moment alignment network (MAN).

To address such challenges or problems, according to some embodiments, the present disclosure provides systems and methods for weakly supervised natural language localization (WSNLL), for example, as implemented in a neural network or model. The WSNLL network is trained with long, untrimmed videos, i.e., videos that have not been temporally segmented or annotated. Examples of datasets for untrimmed videos include ActivityNet, DiDeMo, THUMOS 14, and many of the videos that may appear on the Youtube website. With untrimmed videos, only the whole video is labeled rather than individual frames or segments.

In some embodiments, the WSNLL network or model defines or generates a video-sentence pair, which corresponds to or represents a pairing of an untrimmed video with an input text sentence or query. The text sentence input can be a query about an event or item of interest in the video. The WSNLL approach can relieve the annotation burden by training the neural network or model with only video-sentence pairs, without knowing temporal locations (i.e., starting point and ending point) of the activity or event of interest in the untrimmed video. In other words, with the WSNLL approach, the model or network do not need the start and end times; it only needs to have an activity or event of interest in the video, but not information or data about where that event occurs. Moreover, when combined with text-based video retrieval techniques, video-sentence pairs may be obtained with minimum human intervention. A goal of the WSNLL network or model is to localize the event that is described by the sentence query in a long, untrimmed video.

In some embodiments, WSNLL is implemented with an end-to-end structure for the neural network or deep-learning model. This model can be trained end-to-end in a single stage.

In some embodiments, WSNLL measures segment-text consistency and conducts segment selection (conditioned on the text) simultaneously. Results from both are merged and optimized as a video-sentence matching problem.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a weakly supervised natural language localization network (WSNLL) module 130 that may be used to implement and/or emulate the systems and models, and/or to implement any of the methods described further herein. In some examples, WNSLL module 130 may be used to develop, derive, or generate predictions (e.g., start and end times) for a segment or portion in an untrimmed video in response to an arbitrary text query, as described further herein. In some examples, WSNLL module 130 may also handle the iterative training and/or evaluation of a system or model used to generate such predictions. In some examples, memory 120 may include non-transitory, tangible, machine readable media that includes executable code that when run by one or more processors (e.g., processor 110) may cause the one or more processors to perform the methods described in further detail herein. In some examples, WSNLL module 130 may be implemented using hardware, software, and/or a combination of hardware and software.

As shown, computing device 100 receives as input video data 140 and text data 145, which are provided to WSNLL module 130. The video data 140 may be multi-frame video (e.g., a training video, a video of a sporting event, a full-length movie, or an episode of a television show such as "Friends"). In some examples, the video data is untrimmed, i.e., it has not been temporally segmented or annotated. Examples of datasets for untrimmed videos include THUMOS14, ActivityNet, and many of the videos that may appear on the Youtube website. With untrimmed videos, only the whole video is labeled rather than individual frames or segments. The text data 145 may relate to or comprise text for one or more sentences that can be queries about an event or item of interest in the video. As an example, for an episode of "Friends," the text query can be, "scene where Chandler is talking to Monica."

WSNLL module 130 operates on the input video data 140 and text data 145 to train, and ultimately to develop, derive, or generate predictions or results, e.g., to localize or identify (predict start and end times for) a segment or portion in an untrimmed video in response to an arbitrary text query. The results and predictions are provided as output 150 from computing device 100.

Weakly Supervised Natural Language Localization (WSNLL)

Figure 2:
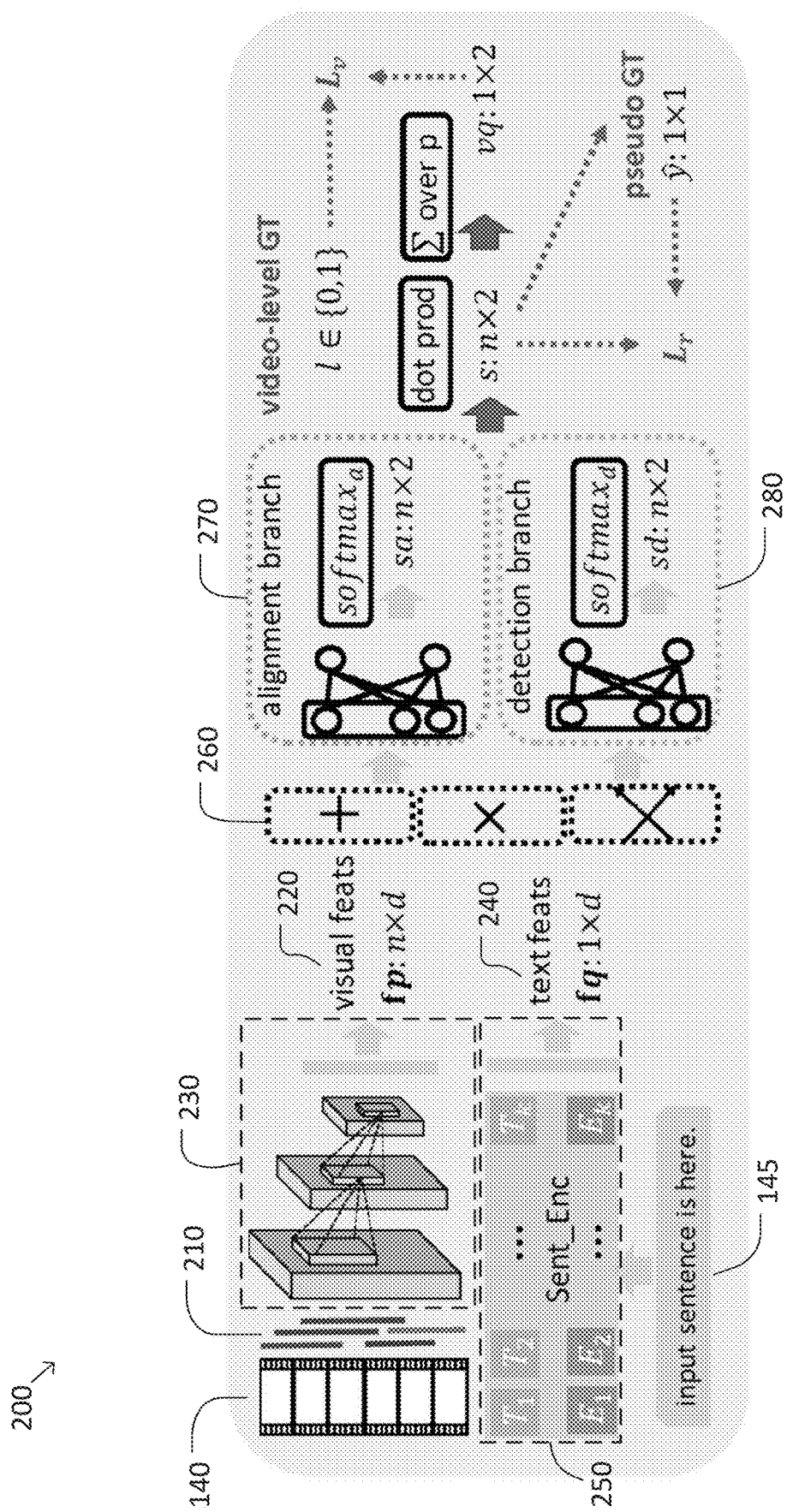
FIG. 2 is a simplified diagram of an approach, according to some embodiments, to provide or implement a weakly supervised natural language localization network.

FIG. 2 is a simplified diagram 200 of the approach, according to some embodiments, for weakly supervised natural language localization (WSNLL) used by a neural network or deep learning model to make a prediction. A goal of the WSNLL network or model is to localize the event that is described by a sentence query in a long, untrimmed video. Diagram 200 shows a workflow or process flow for the WSNLL approach.

The input to WSNLL includes video data (e.g., video data 140) and a text query $Q_i$, (e.g., text data 145). The video data may comprise a video clip or sequence of image frames, $V_i=[I_i^1, I_i^2, \ldots, I_i^T]$. The WSNLL workflow or model defines or generates a video-sentence pair $\{V_i, Q_i\}_1^N$. The video-sentence pair $\{V_i, Q_i\}_1^N$ corresponds to or represents a pairing of the untrimmed video data with the input text sentence or query. The model aims to localize a temporal segment, $[I_i^{st}, \ldots, I_i^{ed}]$, of the video which semantically aligns best with the query $Q_i$. st and ed indicate the start and end times, respectively, of the segment within the untrimmed video. A difference of the WSNLL approach, at least for some embodiments, is that it only utilizes video-sentence pairs, $\{V_i, Q_i\}_1^N$, for training, while supervised approaches have access to the start and end times of the queries.

Taking frame sequences, $[I_i^1, I_i^2, \ldots, I_i^T]$, of video data 140 as inputs, the model may generate a number n of temporal video proposals 210, $\{p_i^1, p_i^2, \ldots, p_i^n\}$, where each proposal $p_i^j$ comprises temporally-continuous image frames or a segment of the input video clip (i.e., less than the full length of the video clip). In some embodiments, the selection or generation of video proposals 210 can be arbitrary (e.g., not necessarily aligned with scene changes). In some embodiments, the video proposals can be made with a "sliding window" that captures or defines the respective set of continuous image frames. In some embodiments, the video proposals can be sequential—e.g., first proposal extending from t0 to t1, second proposal extending from t1 to t2, third proposal extending from t2 to t3, etc. In some embodiments, the video proposals may not be sequential, but instead could overlap and be of varying lengths (e.g., 2 minutes, 3 minutes, 5 minutes, etc.).

According to some embodiments, visual features 220 ("visual feats") are extracted from the n video proposals. In some embodiments, in order to extract the visual features 220, the model may comprise or be implemented with a neural network 230, such as a convolutional neural network (CNN). The CNN 230 comprises a plurality of layers, including convolution and pooling layers, the goal or function of which are to extract features 220 from the images. In some examples, the neural network 230 may comprise a 3D convolutional network. The neural network 230 generates the features or vectors. In some examples, each vector is one-dimensional and represents the video proposal or segment.

In some embodiments, for a video, $V_i=[I_i^1, I_i^2, \ldots, I_i^T]$, features, $fv_i=[fv_i^1, fv_i^2, \ldots, fv_i^T]$, are extracted from each frame. In some embodiments, the features 220 of each video proposal may contain or comprise information of its visual pattern, the overall context and its relative position in the video. In some embodiments, each feature is a vector. The visual feature, $fp_i^j$, of a proposal $p_i^j$ is obtained using $pool(fv_i, j_{st}, j_{ed}) \| pool(fv_i, 0, T) \| [\bar{j}_{st}, \bar{j}_{ed}]$, where $pool(fv_i, j_{st}, j_{ed})$ means average pooling features x from time $t_1$ to $t_2$, $\|$ indicates concatenation, $j_{st}/j_{ed}$ indicates start/end times of the proposal and $\bar{j}$ means time is normalized to [0, 1].

From the text data 145, the model may extract one or more text features 240 ("text feats") for the input text sentence or query. Given a sentence query $Q_i$ of arbitrary length, in some embodiments, one or more sentence encoders (Sent_Enc) 250 can be used to extract text feature, $fq_i$, from the query. In some embodiments, the sentence encoder 250 may be implemented or adopt a language representational model, such as a Bidirectional Encoder Representations from Transformers (BERT) model, as described in more detail in Devlin et al., "BERT: Pre-training of Deep Bidirectional Transformers for Language Understanding," arXiv preprint arXiv:1810.04805, Oct. 11, 2018, which is incorporated by reference herein. With BERT used as the sentence encoder 250, the feature of "[CLS]" at the last layer is extracted as the sentence representation.

Next in the workflow, the visual and text features 220 and 240 (f $p_i$ and $fq_i$) are transformed to the same length, d. In some examples, visual and sentence features are linearly transformed to have the same dimension, d=1000. In some embodiments, the two features are combined by multi-modal processing. This results in a feature that represents both visual and text features for each video proposal. In some embodiments, the transformation or combination of the visual and text features is performed by, or implemented with, one or more fully-connected (FC) layers 260 of a convolutional neural network (CNN).

In some embodiments, as shown, the WSNLL approach next uses or implements two branches: an alignment branch 270 and a detection branch 280. Each of the alignment branch 270 and the detection branch 280 operate on the transformed or combined features of each video proposal.

The alignment branch 270 measures the semantic consistency between the input text query 145 and each video proposal 210. In some embodiments, the alignment branch 270 is implemented with one or more fully-connected (FC) layers of a convolutional network, where the hidden layer has 256 units. In some examples, the alignment branch 270 classifies—e.g., as a "yes" or "no"—whether a video proposal matches the text query. Referring again to the example of an episode of "Friends" as the video and a text query of "scene where Chandler is talking to Monica," some video proposals may include Chandler but not Monica, some proposals may include Monica but not Chandler, and at least one proposal may Chandler and Monica talking. In some embodiments, the alignment branch 270 generates or produces a consistency score, $sa_i \in R^{n \times 2}$, for each video proposal of the video-sentence pair. The consistency score $sa_i^k = \text{softmax}_a(W_a fm_i)$ measures how well the proposal matches the text query. The softmax function calculates the probabilities distribution of the event or item of interest over the n different video proposals. Different proposal scores are calculated independently where $\text{softmax}_a$ indicates applying the softmax function over the last dimension or layer of the convolutional network.

The detection branch 280 performs proposal selection. In some embodiments, detection branch 280 compares the various video proposals of the video-sentence pair, and selects the proposal that is the best match for text sentence or query (with the understanding that only one proposal will be best match). In some embodiments, detection branch 280 generates or produces selection scores $sd_i$. In some embodiments, the detection branch 280 is implemented with one or more fully-connected (FC) layers of a convolutional network, where the hidden layer has 256 units. In some embodiments, the selection score, $sd_i = \text{softmax}_d(W_d fm_i)$, is obtained by applying a softmax function over the video proposals to encourage competition among segments.

Next, the method or approach of WSNLL outputs scores for the n video proposals, $\{s_i^2, s_j^2, \ldots, s_i^n\}$, indicating their likelihood of containing the event or item of interest of the text query (e.g., "scene where Chandler is talking to Monica"). In some embodiments, the consistency scores sa and selection scores sd from the alignment and detection branches 270 and 280 are merged to produce the final results s, e.g., a prediction or classification of the video proposal matching the input text query. In some embodiments, score merging is applied to both parts to obtain the results by dot production, i.e., $s_i=sa_i*sd_i$, for proposals. $s_i$ is used as the final segment-sentence matching scores during inference. Video-level scores, vq, can be obtained by summing s over proposals. In some embodiments, ultimately, there is single promising result. In some examples, one of the video proposals may have the highest score. The highest score could be an indicator for the video proposal that best matches the input text query, e.g., capturing the item of interest and containing the least extraneous content. For example, if two video proposals both include the item of interest for the query but one is longer than the other (and thus, includes more content that is not relevant to the item of interest), the WSNLL will assign or output a higher score to the shorter video proposal.

Training

The WSNLL workflow or model is trained with video-sentence pairs. Training or experiments on the various models and approaches can be conducted using various datasets. Examples of such datasets can include ActivityNet Captions and DiDeMo.

The ActivityNet Captions dataset is described in more detail in Krishna et al., "Dense-captioning captioning events in videos," in *International Conference on Computer Vision* (*ICCV*), 2017, which is incorporated by reference herein. ActivityNet Captions is a large-scale dataset of human activities. It contains 20,000 videos including 100,000 video-sentences in total. In some embodiments, the WSNLL network or model is trained on the training set and tested on the validation set of ActivityNet Captions. Although the dataset provides segment-level annotation, in some embodiments, only video-sentence pairs in the ActivityNet Captions dataset are used for training.

The DiDeMo dataset is described in more detail in Hendricks et al., "Localizing moments in video with natural language," in *Proceedings of the IEEE International Conference on Computer Vision*, pages 5803-5812, 2017, which is incorporated by reference herein. The DiDeMo dataset contains 10,000, 30-second videos including 40,000 annotated segment-sentence pairs. In some embodiments, the WSNLL network or model is trained using video-sentence pairs in the training set and tested on the test set of DiDeMo.

In some embodiments, the whole pipeline of the WSNLL workflow or model is trained end-to-end using video-level and pseudo segment-level labels. To utilize video-sentence pairs as supervision, the model is optimized as a video-sentence matching classifier. In some embodiments, the matching score of a given video-sentence pair is computed by summing $s_i^j$ over the video proposals, $vq_i=\Sigma_{j=1}^n s_i^j$. Then, the loss $L_v=loss(vq_i,l_i)$ may be obtained by measuring the score with the video-sentence match label $l_i \in \{0,1\}$.

In some embodiments, both positive video-sentence pairs and negative video-sentence pairs are used for training. Positive video-sentence pairs are ones where the event or activity specified in the text query actually does appear in the untrimmed video. Positive video-sentence pairs can be obtained directly from, for example, the ActivityNet Captions dataset and/or the DiDeMo dataset. Negative video-sentence pairs are ones where the event or activity specified in the text query does not actually appear in the untrimmed video. Negative video-sentence pairs may be generated by pairing each video with a randomly selected sentence in the training set.

Results can be further refined by adding an auxiliary task $L_r=loss(s_i^j,\hat{y}_i)$ where $\hat{y}_i=\{0, 1, \ldots, n-1\}$ indicates the index of the video segment that best matches the sentence. The real segment-level labels are not available, thus pseudo labels are generated by setting $\hat{y}_i=argmax_j s_i^j$. This loss further encourages competition among proposals. The overall objective is minimizing L in Eq. 1, $$L=loss(vg_i, l_i)+\lambda loss(s_i^j, \hat{y}_i), \qquad (1)$$

where $\lambda$ is a balancing scalar, and loss is cross-entropy loss.

Method

Figure 3:
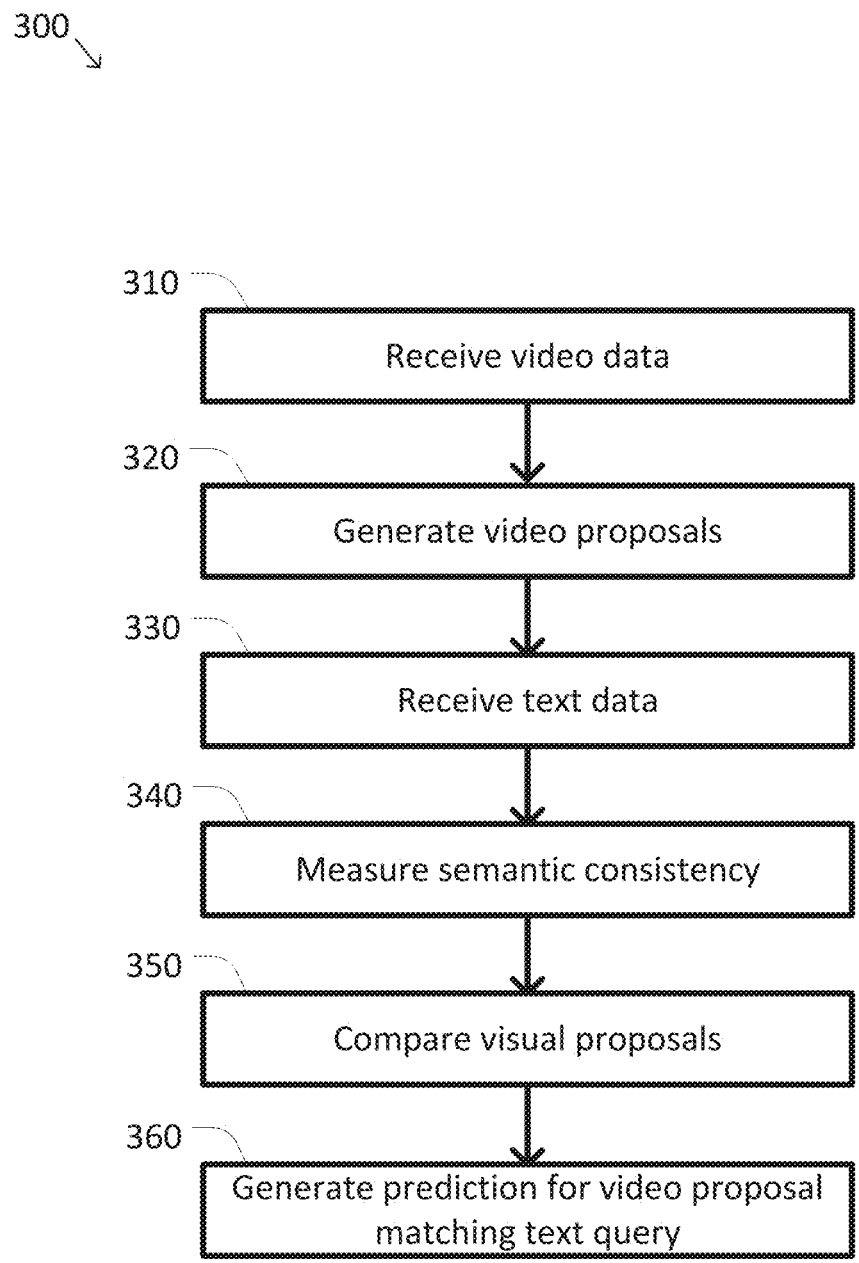
FIG. 3 is a simplified diagram of a method for a weakly supervised natural language localization network, according to some embodiments.

FIG. 3 is a simplified diagram of a method 300 for weakly supervised natural language localization (WSNLL) for an artificial intelligence or deep learning model, according to some embodiments. One or more of the processes 310-350 of method 300 may be implemented, at least in part, in the form of executable code stored on non-transitory, tangible, machine-readable media that when run by one or more processors may cause the one or more processors to perform one or more of the processes 310-350.

In some embodiments, method 300 may correspond to the method used by weakly supervised natural language localization (WSNLL) network or model 200 (or module 130) to develop, derive, or generate predictions or results as to which of a plurality of video proposals (e.g., video proposal 210) matches an input text query (e.g., in text data 145). Further details of method 300 are thus provided in the description for the WSNLL network or model 200.

At a process 310, the WSNLL network or model 200 receives video data 140. The video data 140 may be untrimmed, multi-frame video, i.e., it has not been temporally segmented or annotated. Examples of datasets for untrimmed videos include THUMOS14, ActivityNet, and many of the videos that may appear on the Youtube website. With an untrimmed video, only the whole video is labeled rather than individual frames or segments.

At a process 320, the WSNLL network or model 200 generates a set of video proposals (e.g., video proposals 210) from the untrimmed video of video data 114. Each video proposal comprises temporally-continuous image frames in the video. In some embodiments, the selection or generation of video proposals can be arbitrary (e.g., not necessarily aligned with scene changes in the video). This can be accomplished, for example, using a "sliding window" that captures or defines the set of continuous image frames for each video proposal.

At a process 330, the WSNLL network or model 200 receives text data 145. In some examples, the text data relates to or comprises a query, for example, regarding an event or an item of interest in the video. Taken together, the untrimmed video and input text sentence or query form or define a video-sentence pair.

At a process 340, the WSNLL network or model 200 measures the semantic consistency between the text query and one or more of the visual proposals. To accomplish this, in some embodiments, the WSNLL network or model 200 extracts text features 240 from the text query and visual features 220 from the various video proposals, for example, using a convolutional neural network (CNN) and a language representational model (e.g., BERT). The text and visual features are merged (e.g., by multi-modal processing performed by one or more FC layers 260 of a CNN). An assignment branch 270 of the WSNLL network or model receives the merged features and generates or produces a consistency score for each video proposal. Each consistency score is a measure of semantic consistency between the text query and the corresponding video proposal.

At a process 350, the WSNLL network or model 200 compares the video proposals of the video data 140 to generate a plurality of selection scores. To accomplish this, in some embodiments, the WSNLL network or model 200 receives the merged text and visual features at a detection branch 280. The detection branch 280 compares the various video proposals of the video-sentence pair, and generates or produces selection scores. In some embodiments, the selection score is obtained by applying a softmax function over the video proposals to encourage competition among segments.

At a process 360, the WSNLL network or model 200 develops, derives, or generates predictions or results as to which of the plurality of video proposals 210 best matches the input text query 145. To accomplish this, in some embodiments, module 130 merges the consistency scores from the alignment branch 270 with the selection scores from the detection branch 280. The predictions or results are provided as output 150 from weakly supervised natural language localization module 130.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Results

Results on the weakly supervised natural language localization (WSNLL) network model and approach are presented, and may be compared against other approaches for NLL, including for strongly-supervised approaches (such as CTRL, ABLR, MCN, and LOR) and other weakly-supervised approaches (such as WSDEC-S), as seen in the tables of FIG. 4A-4C.

In some examples, the metrics of R@k, IoU=th and mIoU are used for evaluation. Proposals are ranked according to their matching scores with the input sentence. If the temporal IoU between at least one of the top-k proposals and the ground truth is bigger or equal to th, the sentence is counted as matched. R@k, IoU=th means the percentage of matched sentences over the total sentences given k and th. mIoU is the mean IoU between the top-1 proposal and the ground truth.

Experiments on the various models and approaches can be conducted using various datasets, such as the ActivityNet Captions and DiDeMo datasets. In some embodiments, the models were tested on the validation set of the ActivityNet Captions dataset and the test set of DiDeMo.

Comparison results for experiments on the ActivityNet Captions dataset are shown in FIG. 4A. As seen in FIG. 4A, the WSLLN network or model significantly outperforms the weakly supervised approach WSDEC-W by ~4% mIoU. When compared with strongly supervised approaches, the WSLLN network or model outperforms CTRL by over 11% mIoU. Using the R@1, IoU=0.1 metric, the WSLLN network or model significantly outperforms all the baselines including strongly and weakly supervised methods. Thus, when a scenario is flexible with the IoU coverage, the WSLLN network or model has great advantage over others. When th=0.3/0.5, the WSLLN network or model has comparable results as WSDEC-W and largely outperforms CTRL. The overall results demonstrate good performance of WSLLN, even though there is still a big gap between weakly supervised methods and some supervised ones, i.e., ABLR and WSDEC-S.

FIG. 4B illustrates the R@1 results of an ablation study of WSLLN network or model on the ActivityNet Captions dataset when the balancing scalar $\lambda$ in Equation 1 is set to different values. As shown, WSLLN network or model performs stable when $\lambda$ is set from 0.1 to 0.4. When $\lambda=0$, the refining module is disabled and the performance drops. When $\lambda$ is set to a larger number, e.g., 0.5, the contribution of $L_v$ is reduced and the model performance also drops.

Comparison results for experiments on the DiDeMo dataset are shown in FIG. 4C. The results of the WSLLN network or model are compared with supervised methods, i.e., MCN and LOR. MCN is a supervised NLL model. LOR is a supervised language-object retrieval model. It utilizes much more expensive (object-level) annotations for training. As seen in FIG. 4C, WSLLN performs better than LOR in terms of R@1/5. It is also observed that the gap between the WSLLN method and the supervised NLL model is much larger on the DiDeMo dataset than on the ActivityNet Captions dataset. This may be due to the fact that the DiDeMo dataset is a much smaller dataset, which is a disadvantage for weakly supervised learning.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for weakly supervised natural language localization, the system comprising:
 a memory storing machine executable code; and one or more processors coupled to the memory and configurable to execute the machine executable code to cause the one or more processors to:
receive an untrimmed video clip;
receive a text query regarding an item of interest in the untrimmed video clip;
generate a plurality of video proposals from the untrimmed video clip, wherein each video proposal is a segment of the untrimmed video clip that is less than the full length of the video clip;
transform, for each of the plurality of video proposals, a visual feature of the respective video proposal to have a same dimension with a text feature of the text query;
for each video proposal, generate, by applying a first softmax function over a last layer of one or more fully-connected layers of a first convolutional network, a corresponding consistency score that measures semantic consistency between the respective video proposal and the text query based on visual features encoded from the respective video proposal and text features encoded from the text query;
generate, by one or more fully-connected layers of a second convolutional network and applying a second softmax function over the plurality of video proposals, a plurality of selection scores, each selection score based on a comparison of at least two of the video proposals; and
generate a prediction of which one of the plurality of video proposals is the best match for the text query based on the consistency scores and the selection scores, wherein the best match captures the item of interest and contains the least amount of extraneous content.

2. The system of claim 1, wherein the one or more processors are further configurable to execute the machine executable code to cause the one or more processors to extract a text feature from the text query.

3. The system of claim 1, wherein the one or more processors are further configurable to execute the machine executable code to cause the one or more processors, for each video proposal, to extract the visual feature.

4. The system of claim 1, wherein the memory and the one or more processors implement a neural network model.

5. The system of claim 1, wherein the one or more processors generate the corresponding consistency scores by performing the first softmax function to calculate a probabilities distribution of the item of interest over the plurality of video proposals.

6. The system of claim 1 wherein the one or more processors generate the prediction of which one of the plurality of video proposals is the best match for the text query by merging the consistency scores and the selection scores.

7. The system of claim 1, wherein the generating of the corresponding consistency score for each video proposal and the generating of the plurality of selection scores are based on a transformed video feature of each of the video proposals.

8. The system of claim 1, wherein:
the transforming, for each of the plurality of video proposals, a visual feature of the respective video proposal and the text feature is performed by one or more fully-connected layers of a convolutional neural network.

9. A method for weakly supervised natural language localization comprising:
receiving, at one or more processors, an untrimmed video clip;
receiving, at the one or more processors, a text query regarding an item of interest in the untrimmed video clip;
generating, at the one or more processors, a plurality of video proposals from the untrimmed video clip, wherein each video proposal is a segment of the untrimmed video clip that is less than the full length of the video clip;
transforming, for each of the plurality of video proposals, a visual feature of the respective video proposal to have a same dimension with a text feature of the text query;
for each video proposal, generating, by applying a first softmax function over a last layer of one or more fully-connected layers of a first convolutional network, a corresponding consistency score that measures semantic consistency between the respective video proposal and the text query based on visual features encoded from the respective video proposal and text features encoded from the text query;
generating, by one or more fully-connected layers of a second convolutional network and applying a second softmax function over the plurality of video proposals, a plurality of selection scores, each selection score based on a comparison of at least two of the video proposals; and
generating, at the one or more processors, a prediction of which one of the plurality of video proposals is the best match for the text query based on the consistency scores and the selection scores, wherein the best match captures the item of interest and contains the least amount of extraneous content.

10. The method of claim 9, comprising extracting a text feature from the text query.

11. The method of claim 9, comprising, for each video proposal, extracting the visual feature.

12. The method of claim 9, wherein generating the corresponding consistency scores comprises performing the first softmax function to calculate a probabilities distribution of the item of interest over the plurality of video proposals.

13. The method of claim 9, wherein generating the prediction of which one of the plurality of video proposals is the best match for the text query comprises merging the consistency scores and the selection scores.

14. A non-transitory machine-readable medium comprising executable code which when executed by one or more processors associated with a computer are adapted to cause the one or more processors to perform a method comprising:
receiving an untrimmed video clip;
receiving a text query regarding an item of interest in the untrimmed video clip;
generating a plurality of video proposals from the untrimmed video clip, wherein each video proposal is a segment of the untrimmed video clip that is less than the full length of the video clip;
transforming, for each of the plurality of video proposals, a visual feature of the respective video proposal to have a same dimension with a text feature of the text query;
for each video proposal, generating, by applying a first softmax function over a last layer of one or more fully-connected layers of a first convolutional network, a corresponding consistency score that measures semantic consistency between the respective video proposal and the text query based on visual features encoded from the respective video proposal and text features encoded from the text query;

generating, by one or more fully-connected layers of a second convolutional network and applying a second softmax function over the plurality of video proposals, a plurality of selection scores, each selection score based on a comparison of at least two of the video proposals; and generating a prediction of which one of the plurality of video proposals is the best match for the text query based on the consistency scores and the selection scores, wherein the best match captures the item of interest and contains the least amount of extraneous content.

15. The non-transitory machine-readable medium of claim 14, comprising executable code which when executed by the one or more processors are adapted to cause the one or more processors to extract a text feature from the text query.

16. The non-transitory machine-readable medium of claim 14, comprising executable code which when executed by the one or more processors are adapted to cause the one or more processors to, for each video proposal, extract the visual feature.

17. The non-transitory machine-readable medium of claim 14, wherein generating the consistency score comprises performing the first softmax function to calculate a probabilities distribution of the item of interest over the plurality of video proposals based on a last layer in the first convolutional network.

18. The non-transitory machine-readable medium of claim 14, wherein generating the prediction of which one of the plurality of video proposals is the best matches for the text query comprises merging the consistency scores and the selection scores.

* * * * *